United States Patent
Bosquet et al.

(10) Patent No.: US 9,037,080 B2
(45) Date of Patent: *May 19, 2015

(54) CONTACTLESS ELECTRONIC DEVICE, PROCESS FOR MANUFACTURING THE DEVICE AND CONTACTLESS ELECTRONIC TAG

(75) Inventors: Olivier Bosquet, Vitre (FR); François Launay, Vitre (FR)

(73) Assignee: OBERTHUR TECHNOLOGIES, Levailois-Perret (FR)

( * ) Notice: Subject to any disclaimer, the term of this patent is extended or adjusted under 35 U.S.C. 154(b) by 1127 days.

This patent is subject to a terminal disclaimer.

(21) Appl. No.: 12/947,522

(22) Filed: Nov. 16, 2010

(65) Prior Publication Data
US 2011/0117838 A1    May 19, 2011

(30) Foreign Application Priority Data

Nov. 16, 2009   (FR) ...................................... 09 58059

(51) Int. Cl.
H04B 5/00         (2006.01)
G06K 19/077       (2006.01)

(52) U.S. Cl.
CPC .... *G06K 19/07749* (2013.01); *G06K 19/07739* (2013.01); *G06K 19/0776* (2013.01); *G06K 19/07771* (2013.01)

(58) Field of Classification Search
CPC ........... H04M 1/7253; H04M 2250/02; H04B 5/0062
USPC .......... 455/41.1, 41.2; 235/492, 487
See application file for complete search history.

(56) References Cited

U.S. PATENT DOCUMENTS

| 6,371,380 | B1 | 4/2002 | Tanimura |
| 7,583,192 | B2* | 9/2009 | Tuttle .......................... 340/572.1 |
| 7,830,672 | B1* | 11/2010 | Kitchen ......................... 361/818 |
| 7,918,335 | B1* | 4/2011 | Kitchen ........................... 206/38 |
| 8,060,005 | B2* | 11/2011 | Serbanescu ....................... 455/1 |
| 8,100,337 | B2 | 1/2012 | Artigue et al. |
| 8,439,273 | B2 | 5/2013 | Launay |
| 8,792,246 | B2* | 7/2014 | Kratzer et al. ................. 361/752 |
| 2009/0315320 | A1 | 12/2009 | Finn |
| 2011/0076944 | A1* | 3/2011 | Mihota ......................... 455/41.2 |

FOREIGN PATENT DOCUMENTS

| FR | 2 890 212      | 3/2007 |
| WO | WO 2006/064200 | 6/2006 |
| WO | WO 2007/089404 | 8/2007 |

* cited by examiner

*Primary Examiner* — Andrew Wendell
*Assistant Examiner* — Maryam Soltanzadeh
(74) *Attorney, Agent, or Firm* — Cozen O'Connor

(57) ABSTRACT

The device (10) includes a near-field communication antenna (12) delimiting a useful magnetic field receiving area (S), a microcircuit (14) connected to the antenna (12) and a magnetic shielding layer (16) arranged so as to extend at least partially under the area (S). It also includes a support (18) built into a microcircuit card body (20) including an open cavity (30) in one of its faces (F2) extending at least partially under the antenna area (S) and sized so as to completely accommodate the shielding layer (16). More specifically, the body (20) includes a detachable plate (22) within which are arranged the antenna (12) and the microcircuit (14) and within which the layer (16) extends at least partially.

14 Claims, 2 Drawing Sheets

CONTACTLESS ELECTRONIC DEVICE, PROCESS FOR MANUFACTURING THE DEVICE AND CONTACTLESS ELECTRONIC TAG

RELATED APPLICATIONS

This application claims the priority of French application no. 09/58059 filed Nov. 16, 2009, the disclosure content of which is hereby incorporated by reference.

FIELD OF THE INVENTION

The present invention relates to the technical field of electronic tags of the contactless type. It applies more particularly but not exclusively to electronic tags intended to be applied to the metal surface of an object.

BACKGROUND OF THE INVENTION

By electronic tag is meant an assembly including a support, a near-field communication circuit including an electronic chip and a near-field communication antenna, allowing contactless communication to be established with an external device for exchanging data. The antenna is generally connected to the electronic chip and is used not only as a means of contactless communication, but also to produce the energy needed for power supply to the electronic chip.

In order to ensure optimal transmission of data between the tag and the external device, regardless of the tag's metallic environment, the tag is provided with a magnetic shielding layer capable of protecting the near-field communication circuit.

This offers a particular advantage, especially in a "contactless payment" application carried on a mobile telephone, the mobile telephone including a battery and occasionally even a metal case which can interfere greatly with the quality of data transmission to an external reader when the tag is affixed to the telephone.

A contactless type tag suited for application in a metallic environment is already known in the state of the art, in particular from document WO2008/065278. In this document, the tag includes an intermediate layer made of a magnetically hyper-conductive material, placed against a substrate bearing the antenna and the microcircuit. The assembly made up of the substrate, the antenna and the microcircuit is later embedded in a cover made of plastic by lamination or molding.

The disadvantage of the tag thus obtained is that it is relatively thick due to the presence, in addition to the substrate bearing the antenna and the microcircuit, of the intermediate layer and the cover.

In addition, when it is desired to make tags in various formats, this can lead to problems during customization. In fact, customization equipment must generally be adjusted to the format of the tag to be customized. Further, certain tag formats may not be compatible with customization equipment, which limits considerably the diversity of tags manufactured. Faced with these difficulties, it often happens that customization is frozen at the time the card is manufactured.

There exists at present a need for a tag that is easily customizable, regardless of its shape or format. In addition, this tag must be suited to operate in a metallic environment, as for example next to a mobile telephone.

SUMMARY OF THE INVENTION

One object of the invention is to provide a tag that satisfies this need.

To this end, one aspect of the invention is directed to a contactless electronic device including a near-field communication antenna defining a usable magnetic field receiving area, a microcircuit connected to the antenna and a magnetic shielding layer arranged to extend at least partially under the antenna area, wherein is included a support built into a microcircuit card body including a cavity, opening onto one of its faces, extending at least partially under the antenna area and sized so as to completely accommodate the layer, and wherein the body includes a detachable plate within which are arranged the antenna and the microcircuit and within which the layer extends at least partially.

Thanks to the invention it is easy to make contactless tags in fancy shapes and to customize them graphically.

In fact, due to the fact that the shielding layer is entirely housed in a cavity provided in the body of the chip card, the thickness of the body is relatively limited and matches substantially for instance the standardized thickness of a bank card.

Further, the detachable plate making up the tag is completely integrated into the support consisting of the card body. The card body thus constitutes a temporary adapter for customizing the tag, which can later be separated once the customization is carried out. Thus, the shape of the detachable plate can be fancy without complicating the customization since the customization support consisting of the card body does not vary with the shape of the plate.

It is thus possible to customize the tag after manufacture without requiring customization equipment specifically dedicated to the format of the tag. The shape and the dimensions of the tag can thus be frozen during manufacture and a bank or any other organization wishing to offer contactless type tags can easily customize the tag after its manufacture so long as it constitutes the detachable plate of the device of the invention.

Preferably, the layer having dimensions larger than the antenna area, the layer is arranged to cover the entire usable area of the antenna. In this case, the layer offers optimal protection to the antenna against magnetic perturbations which could be generated by a nearby metallic environment.

In a preferred embodiment of the invention, the cavity and the layer extend at least through the entire plate. This makes it possible in particular to avoid unattractive edge effects connected with a defect in positioning the layer within the plate or with play occurring between the edges of the layer and of the cavity extending into the fixed part of the card body. Indeed, in that case, the layer covers at least the entire area of the plate and any play occurring between the edges of the layer and of the cavity extend in the fixed port of the card body.

A device according to an embodiment of the invention can also include one feature or another such that;

the detachable plate is delimited by a breakable line built into the body and provided to allow separation of the plate and the body by manual pressure alone;

the breakable line includes through incisions and/or partial depth incisions;

the breakable line includes at least one incision passing through the full thickness of the shielding layer;

the line includes two partial depth incisions each made in one of the faces of the body, opposite one another;

the layer is made of a material constituted essentially of ferrite;

the shielding layer includes, on one face oriented to the outside of the cavity, an adhesive coating to allow the detachable plate to be attached by gluing to a surface of a piece of equipment external to the device;

the shielding layer is attached inside the cavity by gluing;

the card body is made by laminating a plurality of layers, at least one of which incorporates the antenna and the microcircuit; and the card body defines a card with a format that conforms to a predefined microcircuit card standard, such as for example the ID-1 format of the ISO 7816 standard.

Another aspect of the invention is directed to a contactless electronic tag including a near-field communication antenna delimiting a usable magnetic field receiving area, a microcircuit connected to the antenna and a magnetic shielding layer arranged to as to cover at least partially the usable area, wherein it constitutes the detachable plate of an electronic device according to the invention.

Another aspect of the invention is directed to a manufacturing process for a device according to the invention, wherein a predefined part incorporating the antenna and the microcircuit is provided in the card body, the cavity is arranged so that it extends at least partially into the predefined part under the usable area of the antenna, the cavity being sized to completely accommodate the shielding layer, and the predefined part is pre-cut, once the layer is secured in the cavity, to form the detachable plate of the card body.

DETAILED DESCRIPTION OF THE DRAWINGS

Figure 1:
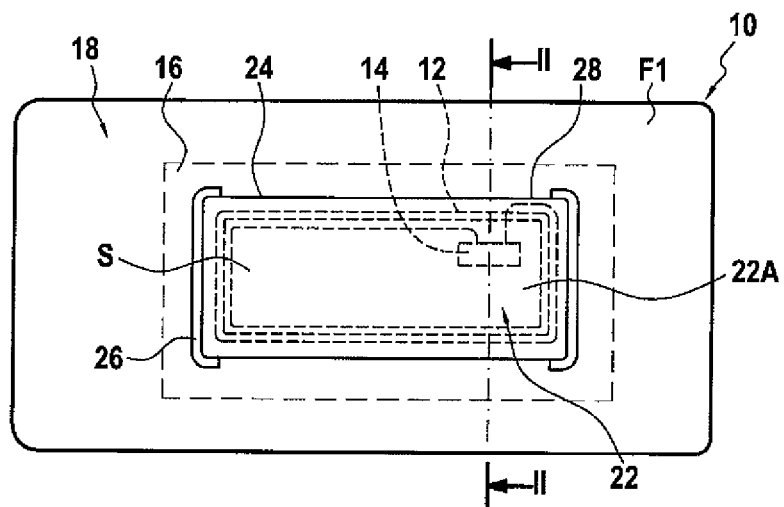
FIG. 1 shows an underside view of a contactless electronic device according to an embodiment of the invention.
Figure 2:
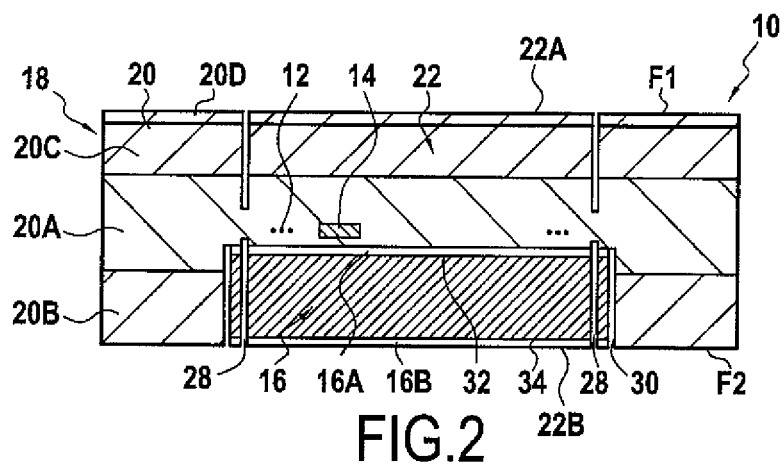
FIG. 2 shows a section view along line II-II of the device in FIG. 1.

Shown in FIGS. 1 and 2 is a contactless electronic device according to the invention. This device is assigned the general reference number 10.

This device 10 includes a near-field communication antenna 12 and a microcircuit 14 connected to antenna 12 shown by transparency (in dotted lines in FIG. 1). Microcircuit 14 and antenna 12 together constitute near-field communication means able to communicate with external equipment such as a specialized reader. As an example, the near-field communication means of device 10 and the reader are able to communicate in compliance with the ISO 14 443 communication protocol.

Antenna 12 is made up for example of a plurality of electrically conductive loops and defines a usable magnetic field receiving area S.

By usable area S is meant, as used in the invention, the area of antenna 12 which, when a magnetic field passes through it, produces an induced current circulating in antenna 12.

In addition, device 10 includes a magnetic shielding layer 16 arranged so as to extend at least partially under area S of antenna 12. Such a layer 16 makes in possible in particular to reduce the magnetic perturbations generated by a metallic environment located close to electronic device 10. Layer 16 is made for example of an electrically insulating and magnetically permeable material, such as ferrite for example. The thickness of the layer lies for example between 200 and 300 microns and its relative permeability is around 100.

Preferably, layer 16 has dimensions larger than antenna area S and is arranged in device 10 so as to cover it over its entire area S.

More specifically, device 10 includes a support 18 built into a microcircuit card body 20.

For example, card body 20 is made of a plastic such as PVC or even PC (polycarbonate). This card body 20 is preferably made by laminating layers of plastic together.

In a preferred embodiment of the invention, body 20 includes a middle layer 20A called an "inlay," incorporating antenna 12 and microcircuit 14, interposed between two layers called lower layer 20B and upper layer 20C and colloquially called the "core layer," and finally a protective layer 20D arranged on the upper layer 20C and being generally made of a plastic that is transparent to visible light.

Preferably, card body 20 delimits outside dimensions that comply with a standardized microcircuit card format, for example the ID1 format of the ISO 7816 standard. This body 20 is delimited by first face F1 and second face F2.

More particularly, body 20 includes a cavity 30, opening onto face F2 of body 20, which extends at least partially under antenna area S. This cavity 30 is sized so as to fully accommodate shielding layer 16. Preferably, shielding layer 16 is flush with the surface of card body 20. In the example described, shielding layer 16 is attached by gluing to the inside of cavity 30. To this end, shielding layer 16 includes on a first face 16A, intended to be oriented toward the inside of cavity 30, a first adhesive coating 32.

In addition, body 20 includes a detachable plate 22 within which are arranged antenna 12 and microcircuit 14, and within which extends at least partially the shielding layer 16 lodged in cavity 30. This detachable plate 22 constitutes a contactless electronic tag within the meaning of the invention.

For example, plate 22 is delimited by a breakable line 24 built into body 20 and provided to allow the separation of plate 22 and body 20 by manual pressure alone along this line 24. For example, line 24 includes through incisions 26 and/or partial depth incisions 28.

In the example illustrated, plate 22 has a substantially rectangular overall shape and through incisions 26 are made along the short side edges and partial depth incisions 28 are made along the long side edges of the rectangle that constitutes plate 22.

In the example illustrated, and preferably, cavity 30 and shielding layer 16 extend at least through the entire plate 22, extending for example beyond both sides of the perimeter of plate 22. Thus, part of breakable line 24 extends over shielding layer 16 and this line 24 includes at least one incision passing through the thickness of shielding layer 16.

In addition, shielding layer 16 includes on a second face 16B, intended to be oriented toward the outside of cavity 30, a second adhesive coating 34 to allow detachable plate 22 to be attached to the surface of a piece of equipment external to device 10, flush with the surface of body 20. Preferably, this second adhesive coating 34 is provided with a removable, non-adhesive foil to facilitate the handling of device 10 and avoid the accumulation of dust or particles on coating 34.

As shown in FIG. 2, the thickness of the first and second adhesive coatings 32 and 34 is taken into account in sizing cavity 30. Thus, in the example described, the second coating 34 is flush with the surface of card body 20.

Figure 7:
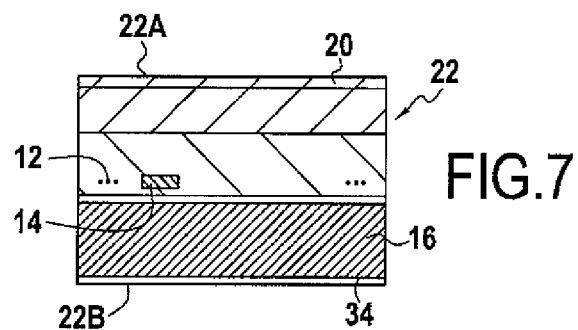

The plate, once it is detached (FIG. 7), constitutes a contactless electronic tag having a reading face 22A from which data can be exchanged between the near-field communication means and an external reader, and a shielding face 22B able to limit all interference that might be generated by an object to which tag 22 is affixed.

Figure 8:
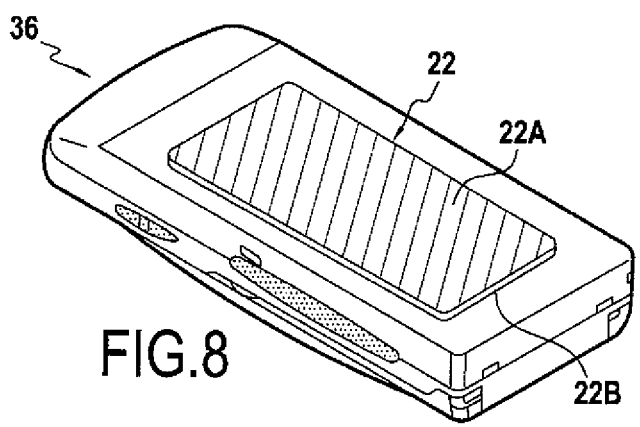
FIG. 8 shows a mobile telephone bearing a contactless electronic tag constituting a detachable plate of the device in FIG. 1.

By way of example, detachable plate 22 incorporates a contactless electronic payment function and is intended to be attached by gluing to a mobile telephone terminal 36, as illustrated in FIG. 8. As seen in this figure in particular, tag 22 is glued to the back of this telephone 36.

Shown in FIGS. 3 through 7 are various steps in a manufacturing process for the device in FIG. 1.

Figure 3:
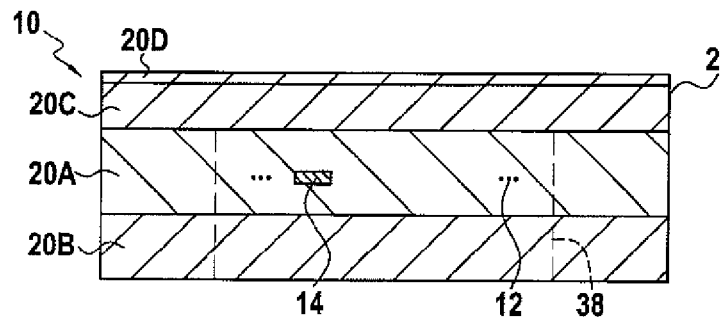
FIGS. 3 through 7 illustrate schematically the various steps in manufacturing the device in FIG. 1.

First of all, the card body 20 is made, for example, by laminating together a plurality of layers 20a through 20D (FIG. 3). A predefined part 38 incorporating antenna 12 and microcircuit 14 is provided in card body 20.

Figure 4:
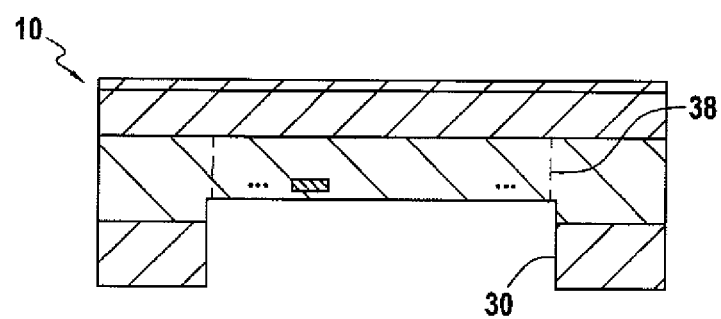

Then the process includes a step in which a cavity 30 is machined in card body 20 (FIG. 4). More specifically, a cavity 30 is provided such that it extends at least partially into predefined part 38 under the usable area S of the antenna. As can be seen in FIG. 4, cavity 30 extends through the entire predefined part 38, extending beyond its periphery.

Figure 5:
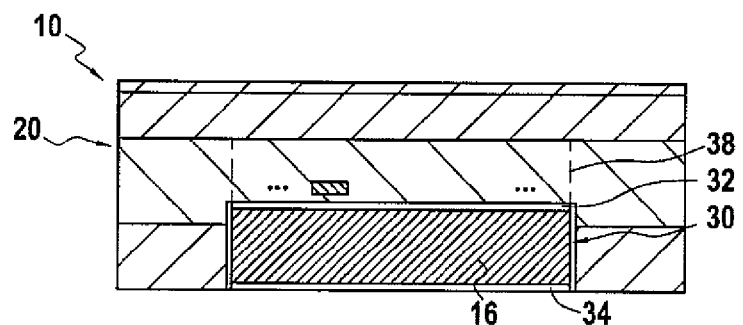

Then, the process includes a step in which the magnetic shielding layer 16 is attached to the inside of cavity 30 illustrated by FIG. 5. Preferably, this ferrite layer 16 is attached by gluing to the inside of cavity 30. In addition, the shielding layer includes, on the face opposite the face glued to the bottom of the cavity, the second adhesive coating 34 provided with a removable anti-adhesive foil.

Figure 6:
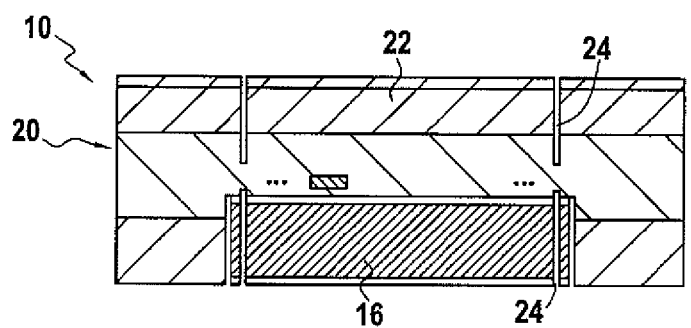

Finally, the process includes a step in which the predefined part 38 is pre-cut to form the detachable plate of the card body as illustrated by FIG. 6. In the preferred embodiment of the invention, this pre-cutting step consists of forming a breakable line 24 allowing the separation of plate 22 from body 20 by manual pressure alone.

Due to the fact that the shielding layer 16 is incorporated into a support made up of a microcircuit card body, the thickness of the support is relatively reduced.

It is understood that the embodiments just described do not have any limiting character and that they can undergo any desirable modification without thereby departing from the substance of the invention.

We claim:

1. A contactless electronic device comprising:
   a near-field communication antenna delimiting a usable magnetic field receiving area;
   a microcircuit connected to said antenna;
   a magnetic shielding layer arranged so as to extend at least partially under the usable magnetic field receiving area; and
   a microcircuit card body including an open cavity on one face of the microcircuit card body, the cavity extending at least partially below the usable magnetic field receiving area and sized so as to completely accommodate the magnetic shielding layer,
   wherein the microcircuit card body includes a detachable plate, the antenna and the microcircuit being arranged in the microcircuit body within an area of the detachable plate, and the magnetic shielding layer extending at least partially within the area of the detachable plate.

2. The device according to claim 1, wherein, the magnetic shielding layer having dimensions greater than the area of the antenna, the magnetic shielding layer is arranged so as to cover the entire usable magnetic field receiving area.

3. The device according to claim 1, wherein the cavity and the magnetic shielding layer extend at least through the entire detachable plate.

4. The device according to claim 1, wherein the detachable plate is delimited by a breakable line built into the microcircuit card body and provided to allow separation of the detachable plate from the microcircuit card body by manual pressure alone.

5. The device according to claim 4, wherein the breakable line includes through incisions and/or partial depth incisions.

6. The device according to claim 4, wherein the breakable line includes at least one incision passing through the entire thickness of the magnetic shielding layer.

7. The device according to claim 4, wherein the breakable line includes two partial-depth incisions, each made in one of the faces of the microcircuit card body opposite one another.

8. The device according to claim 1, wherein the magnetic shielding layer is made of a material consisting essentially of ferrite.

9. The device according to claim 1, wherein the magnetic shielding layer includes, on a face oriented toward the outside of the cavity, an adhesive coating to allow the detachable plate to be attached by gluing onto a surface of a piece of equipment external to the device.

10. The device according to claim 1, wherein e magnetic shielding layer is attached by gluing within the cavity.

11. The device according to claim 1, wherein the microcircuit card body is made by lamination of a plurality of layers, of which at least one incorporates the antenna and the microcircuit.

12. The device according to claim 1, wherein the microcircuit card body delimits a card with a format that complies with a predefined microcircuit card standard, such as the ID-1 format of the ISO 7816 standard for example.

13. The device according to claim 1, wherein said detachable plate comprises:
   a contactless electronic tag comprising a near-field communication antenna delimiting a usable magnetic field receiving area;
   a microcircuit connected to the antenna, and
   a magnetic shielding layer arranged so as to cover at least partially the usable magnetic field receiving area.

14. A manufacturing process for a device according to claim 1, wherein a predefined part is provided in the microcircuit card body, incorporating the antenna and the microcircuit, the cavity is arranged so that it extends at least partially within the predefined part under the usable magnetic field receiving area, the cavity being sized so as to completely accommodate the magnetic shielding layer and the predefined part is pre-cut once the magnetic shielding layer is attached within the cavity to constitute the detachable plate of the microcircuit card body.

\* \* \* \* \*